(12) United States Patent
Konrad et al.

(10) Patent No.: US 8,487,025 B2
(45) Date of Patent: Jul. 16, 2013

(54) BRANCHED MELT POLYCARBONATE WITH LOW CONTENT OF DEFECTIVE STRUCTURES

(75) Inventors: Stephan Konrad, Dormagen (DE); Helmut-Werner Heuer, Krefeld (DE); Karl-Heinz Köhler, Aachen-Brand (DE); Christian Münnich, Leverkusen (DE); Rolf Wehrmann, Krefeld (DE)

(73) Assignee: Bayer Material Science AG, Monheim (DE)

( * ) Notice: Subject to any disclaimer, the term of this patent is extended or adjusted under 35 U.S.C. 154(b) by 272 days.

(21) Appl. No.: 13/081,847

(22) Filed: Apr. 7, 2011

(65) Prior Publication Data

US 2011/0251309 A1 Oct. 13, 2011

(30) Foreign Application Priority Data

Apr. 7, 2010 (EP) .................. 10159245

(51) Int. Cl.
*C08K 5/51* (2006.01)

(52) U.S. Cl.
USPC ........... 524/128; 524/100; 524/154; 524/121; 524/108; 524/151; 528/128; 528/147

(58) Field of Classification Search
USPC ....................................... 524/128
See application file for complete search history.

(56) References Cited

U.S. PATENT DOCUMENTS

| 5,475,079 | A | 12/1995 | Okano et al. |
| 5,597,887 | A | 1/1997 | King, Jr. et al. |
| 5,606,007 | A | 2/1997 | Sakashita et al. |
| 5,932,683 | A | 8/1999 | Hachiya et al. |
| 6,307,006 | B1 | 10/2001 | Konig et al. |
| 2007/0001910 | A1 | 1/2007 | Yamanaka et al. |

FOREIGN PATENT DOCUMENTS

| DE | 19727709 A1 | 1/1999 |
| EP | 1369446 A1 | 12/2003 |
| EP | 1472302 A2 | 11/2004 |
| EP | 1500671 A1 | 1/2005 |
| JP | 04-089824 A | 3/1992 |
| JP | 04-175368 B2 | 6/1992 |
| JP | 06-298925 A | 10/1994 |
| WO | WO-02/46272 A2 | 6/2002 |

OTHER PUBLICATIONS

Hartmann et al., Zeitschr. Anorg. Ch. 287(1956) 261, 264. (Article is not in the English language; see Specification p. 16, lines 19-20).
Issleib, K. et al., Chem. Ber., 92(1959), 3175, 3179. (Article is not in the English language; see Specification p. 16, lines 19-20).
Prevorsek, D.C. et al., Corporate Research Center, Allied Chemical Corporation, Moristown, New Jersey 07960, "Synthesis of Poly(ester)carbonate Copolymers" in Journal of Polymer Science, Polymer Chemistry Edition, vol. 19, 75-90 (1980).

*Primary Examiner* — Doris Lee
(74) *Attorney, Agent, or Firm* — Novak Druce Connolly Bove + Quigg LLP

(57) ABSTRACT

The present invention relates to an aromatic branched polycarbonate, produced via melt transesterification of a bisphenol with a diaryl carbonate in the presence of a branching agent, wherein the aromatic branched polycarbonate comprises branching point structures and structures of formula (D)

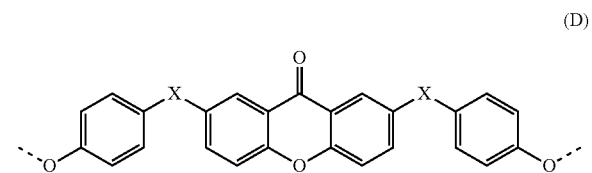

wherein X is a single bond, C1- to C6-alkylene, C2- to C5-alkylidene or C5- to C6-cycloalkylidene, optionally substituted by C1- to C6-alkyl; wherein the amount of D in the aromatic branched polycarbonate is in the range of from 5 to 450 mg per kg of the aromatic branched polycarbonate; and wherein the ratio of the total branching point structures to the total structures of the formula D in the aromatic branched polycarbonate is in the range of from 8 to 200.

13 Claims, No Drawings

BRANCHED MELT POLYCARBONATE WITH LOW CONTENT OF DEFECTIVE STRUCTURES

RELATED APPLICATIONS

This application claims benefit to European Patent Application No. 10 159 245.9, filed Apr. 7, 2010, which is incorporated herein by reference in its entirety for all useful purposes.

BACKGROUND OF THE INVENTION

The invention relates to branched aromatic polycarbonates having defined ratios of polymer chain branching points and of defective structures within the polymer chain with respect to one another, and also to a process for producing these branched aromatic polycarbonates. The invention particularly relates to those branched aromatic polycarbonates which by virtue of their production process via transesterification of bisphenols with diaryl carbonates in the melt comprise not only the intended polymer chain branching points, e.g. via trifunctional branching-agent molecules, but also defective structures within the polymer chain in the form of undesired by-products. These defective structures have a disadvantageous effect on the rheology of the resultant polycarbonates during processing thereof in the melt.

The advantageous properties of polycarbonates having controlled branching, in comparison with linear polycarbonates, are particularly utilized during the thermoplastic processing of the said materials. Polycarbonate (PC) is processed inter alia by the extrusion process and the injection-moulding process. In the case of the extrusion process, the shear rates arising are in the range $\leq 1000$ [l/s]; high viscosity of the polymer melt is required here for good processability of polycarbonate melts to give extruded items. When branched polycarbonates are being developed in particular for use in extrusion applications there is therefore a need for polycarbonates with adequately high melt viscosity at low shear rates, and this therefore means polycarbonates with pronounced pseudoplasticity.

Branched polycarbonate can be produced by various processes. The first type of polycarbonate to achieve industrial significance was SolPC, produced by the solution-polymerization process. In the SolPC process, units of relatively high functionality, and in this case especially trifunctional units, are added in order to provide branching in the PC, examples being 1,1,1-tris(4-hydroxyphenyl)ethane (THPE), isatinbiscresol (IBC), and trimellitic acid, etc.

The second process used in industry is the melt-polycarbonate (MeltPC) process. Polycarbonate which is produced in the melt from organic carbonates, e.g. diaryl carbonates, and from bisphenols, without use of additional solvents, by what is known as the melt-transesterification process, also known as the melt process, is achieving increasing economic importance and is therefore a suitable material for many application sectors.

The production of aromatic polycarbonates by the melt-transesterification process is known and is described by way of example in "Schnell", Chemistry and Physics of Polycarbonates, Polymer Reviews, Vol. 9, Interscience Publishers, New York, London, Sydney 1964, in D. C. Prevorsek, B. T. Debona and Y. Kersten, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75-90 (1980), in D. Freitag, U. Grigo, P. R. Müller, N. Nouvertne, BAYER AG, "Polycarbonates" in Encyclopedia of Polymer Science and Engineering, Vol. 11, Second Edition, 1988, pages 648-718 and finally in Des. U. Grigo, K. Kircher and P. R. Müller "Polycarbonate" [Polycarbonates] in Becker/Braun, Kunststoff-Handbuch [Plastics handbook], Volume 3/1, Polycarbonate, Polyacetale, Polyester, Celluloseester [Polycarbonates, polyacetals, polyesters and cellulose esters], Carl Hanser Verlag Munich, Vienna 1992, pages 117-299.

It is known that polycarbonates produced by the MeltPC process have defective structures within the polymer chain. The nature and amount of the said defective structures depends on various process parameters, e.g. temperature, residence time, and also especially the nature and amount of the catalyst used. It is moreover known that alkali-metal compounds and alkaline-earth-metal compounds favour the formation of defective structure (see, for example, EP 1369446 B1 and EP 1500671 A1).

The defective structures have inter alia xanthone structures, which are responsible for lowering the melt viscosity at low shear gradients. Defective structures having xanthone structures are therefore particularly undesirable in MeltPC.

There was therefore a need for melt polycarbonates with the advantageous properties of controlled polymer-chain branching points created by using polyfunctional monomers in the synthesis of the polymer, but without the disadvantageous rheological property changes due to the undesired defective structures within the polymer chain.

There was therefore a requirement to produce MeltPC with controlled branching generated by polyfunctional monomers, preferably by trifunctional phenolic compounds and particularly preferably by THPE, during the synthesis process, where the MeltPC has pronounced pseudoplasticity at low shear rates of, for example, $\leq 1000$ [l/s], and at the same time has minimum amounts of xanthone structures within the polymer chain. The ratio of controlled branching points using trifunctional phenols to the entirety of undesired xanthone structures within the polymer chain here should be markedly greater than 8, preferably greater than 15.

Branched melt polycarbonates and production of these with use of trifunctional aromatic hydroxy compounds are in principle known. By way of example, U.S. Pat. No. 5,597,887(A) describes the use of very large amounts, 2 mol % and more, of THPE as branching agent for producing melt polycarbonate, which is then blended in a second step with unbranched PC and equilibrated in the melt, in order to obtain a material that can be blow-moulded. The patent says nothing about the content of, or the avoidance, of xanthone structures within the polymer chain.

Other patents that describe branching points in MeltPC using THPE as branching agent are JP-04-089824, JP-04-175368, JP-06-298925 and EP1472302A1, but nothing is said there about the ratio of branching points to xanthone structures within the polymer chain.

It was therefore an object of the invention to find a simple melt-transesterification process which has no additional steps and which can produce suitably branched polycarbonates and which overcomes the disadvantages of the processes cited above and which can efficiently adjust the abovementioned ratio of branching points to xanthone structures within the polymer chain in the MeltPC.

Surprisingly, it has been found that the use of specifically purified branching agents, preferably of trihydroxyaryl compounds and in particular of 1,1,1-tris(4-hydroxyphenyl)ethane (THPE) for producing branched polycarbonates in the melt-transesterification process produces a branched MeltPC which comprises markedly fewer xanthone structures within the polymer chain than melt polycarbonates produced by using an unpurified commercially available branching agent in the melt-transesterification process. This method can produce melt polycarbonates where the ratio of branching-agent structures to xanthone structures within the polymer chain is markedly greater than 8, preferably greater than 15. The specific purification of the branching agent is undertaken in solution on cation exchangers.

BRIEF DESCRIPTION OF THE INVENTION

An embodiment of the present invention is an aromatic branched polycarbonate, produced via melt transesterification of a bisphenol with a diaryl carbonate in the presence of a branching agent, wherein the aromatic branched polycarbonate comprises branching point structures and structures of formula (D)

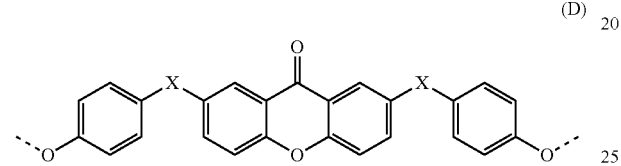
(D)

wherein X is a single bond, C1- to C6-alkylene, C2- to C5-alkylidene or C5- to C6-cycloalkylidene, optionally substituted by C1- to C6-alkyl; wherein the amount of D in the aromatic branched polycarbonate is in the range of from 5 to 450 mg per kg of the aromatic branched polycarbonate; and wherein the ratio of the total branching point structures to the total structures of the formula D in the aromatic branched polycarbonate is in the range of from 8 to 200.

Yet another embodiment of the present invention is a composition comprising the above polycarbonate and at least one organic phosphorus compound selected from the group consisting of phosphines, phosphites, diphosphites, phosphates and mixtures thereof.

Another embodiment of the present invention is the above composition wherein the at least one organic phosphorus compound is a phosphine and the phosphine has the following structure:

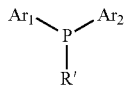
(I)

wherein $Ar_1$ and $Ar_2$ are, independently of one another, optionally substituted aryl moieties; and R' is an optionally substituted aryl moiety or at least one moiety selected from the group consisting of

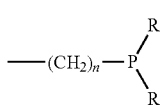
(Ia)

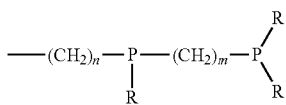
(Ib)

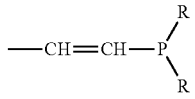
(Ic)

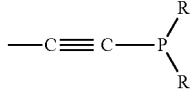
(Id)

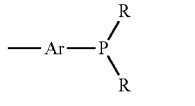
(Ie)

where Ar = R
($C_6$-$C_{14}$-aryl moiety)

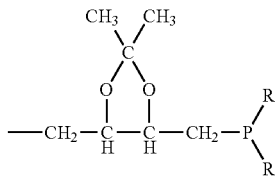
(If)

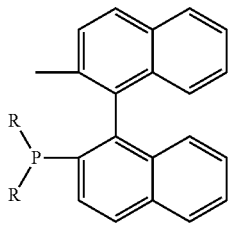
(Ig)

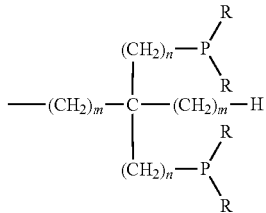
(Ih)

wherein R represents an unsubstituted or substituted $C_6$-$C_{14}$-aryl moiety; and
n and m are independently of one another, an integer from 1 to 7,
wherein the H atoms of the moieties (Ia) to (Ic) can also be replaced by substituents; and wherein R' can also be 4-phenylphenyl or α-naphthyl, if $Ar_1$ and $Ar_2$ in formula (I) are respectively likewise 4-phenylphenyl or α-naphthyl and wherein the 4-phenylphenyl moieties and the α-naphthyl moieties can have substitution.

Another embodiment of the present invention is the above composition wherein the phosphine is triphenylphosphine.

Another embodiment of the present invention is the above composition wherein the at least one organic phosphorus compound is a phosphite and is tris(2,4-tert-butylphenyl) phosphite.

Another embodiment of the present invention is the above composition wherein the composition further comprises an aliphatic carboxylic ester of formula (III)

(III)

where o is an integer from 1 to 4, p is an integer from 0 to 3, $R_4$ is an aliphatic, saturated or unsaturated, linear, cyclic or branched alkyl moiety, and $R_5$ is an alkylene moiety of a mono- to tetravalent aliphatic alcohol of the formula $R_5$—$(OH)_{o+p}$.

Another embodiment of the present invention is the above composition wherein the composition further comprises a UV absorber selected from the group consisting of benzotriazoles, triazines, cyanoacrylates and malonic esters.

Another embodiment of the present invention is the above composition wherein the composition further comprises an aromatic antioxidant.

Another embodiment of the present invention is the above composition wherein the aromatic antioxidant is n-octadecyl 3-(3,5-di-tert-butyl-4-hydroxyphenyl)propionate.

Yet another embodiment of the present invention is a process for producing the above polycarbonate, wherein the process comprises reacting a bisphenol with a diaryl carbonate in the presence of a branching agent in a melt transesterification process; and purifying the branching agents prior to using the branching agents in the melt transesterification process.

Another embodiment of the present invention is the above process further comprising pretreating the branching agents with a cation exchanger in solution before using the branching agents in the melt transesterification process.

Another embodiment of the present invention is the above process wherein the branching agent is 1,1,1-tris(4-hydroxyphenyl)ethane (THPE).

Another embodiment of the present invention is the above process wherein the melt transesterification process further comprises a catalyst of formula (VII)

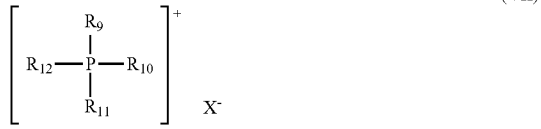

(VII)

wherein $R_9$, $R_{10}$, $R_{11}$ and $R_{12}$ represent, independently of one another, a compound selected from the group consisting of $C_1$- to $C_{18}$-alkylene moieties, $C_6$ to $C_{10}$-aryl moieties, and $C_5$ to $C_6$-cycloalkyl moieties; and $X^-$ represents an anion, wherein the corresponding acid-base pair $H^+ + X^- \rightarrow HX$ has a $pK_b$ of less than 11.

DETAILED DESCRIPTION OF THE INVENTION

The invention therefore provides branched melt polycarbonates where the ratios of branching point structures to xanthone structures within the polymer chain are greater than 8, preferably greater than 15. The invention further provides a melt-polycondensation process for producing branched MeltPCs where the ratios of branching point structures to xanthone structures within the polymer chain are greater than 8, preferably greater than 15, characterized in that the branching agent used is subjected, prior to use in the polycondensation reaction, to a purification process, for example on cation exchangers, by distillation, or by purification on an adsorbent or by crystallization. The invention further provides compositions of branched melt polycarbonates where the ratios of branching point structures to xanthone structures within the polymer chain are from 8 to 200, preferably from 10 to 100, particularly preferably from 15 to 80, with conventional additives, examples being stabilizers, mould-release agents, flow aids, antioxidants, colorants, UV absorbers and IR absorbers and/or mixture constituents, where these are selected from the group of the thermoplastics, of the elastomers, of the flame retardants and of the fillers and reinforcing materials.

The polycarbonate to be used according to the invention is produced by the melt-transesterification reaction of suitable bisphenols and diaryl carbonates in the presence of a suitable catalyst, and also of branching agents. The polycarbonate can also be produced by condensation of carbonate oligomers which comprise terminal hydroxy and/or carbonate groups, and of suitable diaryl carbonates and bisphenols. The polycarbonate to be used according to the invention can also be produced by a two-stage process by producing carbonate oligomers in the abovementioned melt-transesterification reaction and then by polycondensation of the said carbonate oligomers in finely divided solid phase at an elevated temperature in vacuo or with passage of hot inert gases.

Preferred carbonate oligomers are described by the formula (IV) with molar masses of from 153 to 15 000 [g/mol],

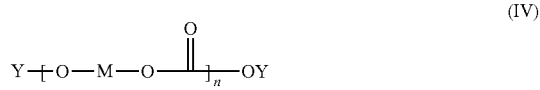

(IV)

where the square bracket indicates n repeat structural units,
M is Ar or a polyfunctional component system D,
where Ar can be a component system represented by formula (VIII) or (IX), and preferably (IX)

(VIII)

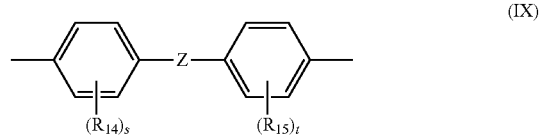

(IX)

in which
Z is $C_1$ to $C_8$-alkylidene or $C_5$ to $C_{12}$-cycloalkylidene, S, $SO_2$ or a single bond,
$R_{13}$, $R_{14}$, and $R_{15}$ are mutually independently a substituted or unsubstituted $C_1$-$C_{18}$ alkyl moiety, preferably substituted or unsubstituted phenyl, methyl, propyl, ethyl, butyl, Cl or Br and
r, s, t is mutually independently 0, 1 or 2,
n is a natural number, where component system D is a component system of the formula

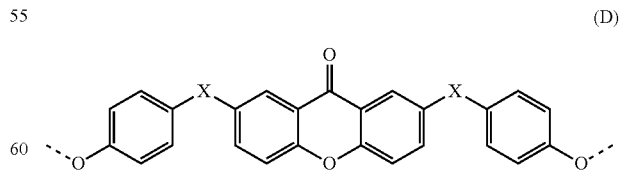

(D)

and the amounts present thereof are from 5 to 450 ppm, based on the polymer after total hydrolysis of the polycarbonate (contents determined by using HPLC after alkaline hydrolysis), where Y=H or a component system of the formula (X)

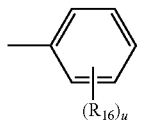
(X)

where
$R_{16}$ can be identical or different and can be H, $C_1$ to $C_{20}$-alkyl, $C_6H_5$ or $C(CH_3)_2C_6H_5$, and
u can be 0, 1, 2 or 3,
where
X is a single bond, C1- to C6-alkylene, C2- to C5-alkylidene or C5- to C6-cycloalkylidene, which can have substitution by C1- to C6-alkyl, preferably by methyl or ethyl.

Component system D is a xanthone derivative.

Suitable diaryl carbonates in the context of the invention are di-$C_6$- to di-$C_{14}$-aryl esters, preferably the diesters of phenol or of alkyl- or aryl-substituted phenols, i.e. diphenyl carbonate, dicresyl carbonate and di-4-tert-butylphenyl carbonate. Diphenyl carbonate is most preferred.

Among the suitable di-$C_6$ to di-$C_{14}$-aryl esters are also asymmetrical diaryl esters which comprise two different aryl substituents. Preference is given to phenyl cresyl carbonate and to 4-tert-butylphenyl phenyl carbonate.

Among the suitable diaryl esters are also mixtures of more than one di-$C_6$-$C_{14}$-aryl ester. Preferred mixtures are mixtures of diphenyl carbonate, dicresyl carbonate and di-4-tert-butylphenyl carbonate.

The amounts that can be used of the diaryl carbonates, based on 1 mol of diphenol, are from 1.00 to 1.30 mol, particularly preferably from 1.02 to 1.20 mol and most preferably from 1.05 to 1.15 mol.

Compounds corresponding to the formula (V) are suitable dihydroxyaryl compounds in the context of the invention:

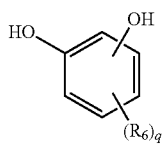
(V)

in which
$R_6$ is substituted or unsubstituted phenyl, methyl, propyl, ethyl, butyl, Cl or Br and q is 0, 1 or 2.

Preferred dihydroxybenzene compounds are 1,3-dihydroxybenzene, 1,4-dihydroxybenzene and 1,2-dihydroxybenzene.

Compounds corresponding to the formula (VI) are suitable dihydroxydiaryl compounds in the context of the invention:

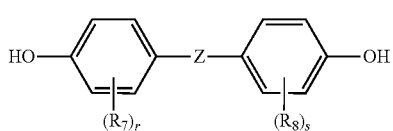
(VI)

where
Z is $C_1$ to $C_8$-alkylidene or $C_5$ to $C_{12}$-cycloalkylidene, S, $SO_2$ or a single bond, $R_7$, $R_8$ is mutually independently substituted or unsubstituted phenyl, methyl, propyl, ethyl, butyl, Cl or Br and
r, s is mutually independently 0, 1 or 2.

Preferred diphenols are 4,4'-dihydroxybiphenyl, 4,4'-dihydroxydiphenyl sulphide, 1,1-bis(4-hydroxyphenyl)cyclohexane, 1,2-bis(4-hydroxyphenyl)benzene, 1,3-bis(4-hydroxyphenyl)benzene, 1,4-bis(4-hydroxyphenyl)benzene, bis(4-hydroxyphenyl)methane, 2,2-bis(4-hydroxyphenyl)propane, 2,4-bis(4-hydroxyphenyl)-2-methylbutane, 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, bis(4-hydroxyphenyl)sulphone, 1,2-bis[2-(4-hydroxyphenyl)isopropyl]benzene, 1,3-bis[2-(4-hydroxyphenyl)isopropyl]benzene, 1,4-bis[2-(4-hydroxyphenyl)isopropyl]benzene, 1,1-bis(4-hydroxyphenyl)-1-phenylethane, 2,4-bis(4-hydroxyphenyl)-2-methylbutane, 2,2-bis(3,5-dichloro-4-hydroxyphenyl)propane, 2,2-bis(3,5-dibromo-4-hydroxyphenyl)propane, 1,1-bis(4-hydroxyphenyl)-3,3,5-trimethylcyclohexane.

The most preferred diphenols are 1,1-bis(4-hydroxyphenyl)-1-phenylethane, 2,2-bis(4-hydroxyphenyl)propane, 4,4'-dihydroxybiphenyl, 1,1-bis(4-hydroxyphenyl)-3,3,5-trimethylcyclohexane, 2,2-bis(3,5-dibromo-4-hydroxyphenyl)propane and 1,3-bis[2-(4-hydroxyphenyl)isopropyl]benzene.

Among the suitable diphenols are also mixtures of more than one diphenol; this would produce a copolycarbonate. The most preferred mixture components are 1,3-bis[2-(4-hydroxyphenyl)isopropyl]benzene, 1,1-bis(4-hydroxyphenyl)-3,3,5-trimethylcyclohexane, 2,2-bis(4-hydroxyphenyl)propane, 4,4'-dihydroxybiphenyl and 2,2-bis(3,5-dibromo-4-hydroxyphenyl)propane.

Other compounds also added alongside the diphenols comprise from 0.1 to 3 mol %, preferably from 0.15 to 2 mol %, relative to the diphenol or, respectively, to the entirety of the diphenols, of suitable branching agents, e.g. compounds which comprise three or more functional OH groups or acid groups. By virtue of the branching, rheology becomes more non-Newtonian, and there is a greater reduction in viscosity as shear increases. Among the suitable branching agents are phloroglucinol, 3,3-bis(3-methyl-4-hydroxyphenyl)-2-oxo-2,3-dihydroindole, 4,6-dimethyl-2,4,6-tris(4-hydroxyphenyl)hep-2-ene, 4,6-dimethyl-2,4,6-tris(4-hydroxyphenyl)heptane, 1,3,5-tris(4-hydroxyphenyl)benzene, 1,1,1-tris(4-hydroxyphenyl)ethane (THPE), tris(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, hexakis(4-(4-hydroxyphenylisopropyl)phenyl) orthoterephthalate, tetrakis(4-hydroxyphenyl)methane, tetrakis(4-(4-hydroxyphenylisopropyl)phenoxy)methane, 1,4-bis((4',4"-dihydroxytriphenyl)methyl)benzene and isatinbiscresol, pentaerythritol, 2,4-dihydroxybenzoic acid, trimesic acid and cyanuric acid.

Preferred branching agents are trishydroxyaryl compounds, and THPE is particularly preferred as branching agent.

Suitable purification processes, in particular treatment with cation exchangers, are used to free the branching agent used according to the invention from by-products which are present therein and which can trigger the formation of xanthone structures within the polymer chain during the melt polycondensation of MeltPC.

Examples of catalysts suitable for producing the polycarbonates according to the invention are those of the general formula (VII)

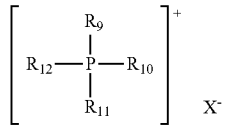

in which
$R_9$, $R_{10}$, $R_{11}$ and $R_{12}$ can designate mutually independently the same or different $C_1$- to $C_{18}$-alkylene moieties, $C_6$ to $C_{10}$-aryl moieties or $C_5$ to $C_6$-cycloalkyl moieties and
$X^-$ can be an anion, where the $pK_b$ of the corresponding acid-base pair $H^+ + X^- \rightarrow HX$ is <11.

Preferred catalysts are tetraphenylphosphonium fluoride, tetraphenylphosphonium tetraphenyl-borate and tetraphenylphosphonium phenolate. Tetraphenylphosphonium phenolate is most preferred. Examples of preferred amounts of phosphonium-salt catalysts are from $10^{-2}$ to $10^{-8}$ mol per mole of diphenol, and the most preferred amounts of catalyst are from $10^{-4}$ to $10^{-6}$ mol per mole of diphenol.

The polycarbonates can be produced in stages, the temperatures can be implemented in stages in the range from 150 to 400° C., the residence time in each stage can amount to from 15 minutes to 5 hours, and the pressures in each stage can amount to from 1000 to 0.01 mbar. It is particularly preferable that the temperature increases from one stage to the next and that the pressure decreases from one stage to the next. There is no restriction on the juncture of addition of the branching agent, which can be added prior to each stage of the process, at the beginning, or else prior to the final stage.

The melt polycarbonates branched according to the invention can likewise be produced via mixing and homogenization of suitable branched polycarbonates with suitable predominantly linear polycarbonates in the polymer melt in defined ratios to one another.

The melt polycarbonates preferably used are characterized by the general formula (IV)

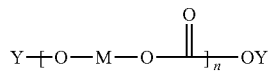

where Y=H or an unsubstituted or substituted aryl moiety and n and M correspond to the corresponding variables previously explained within this application.

The average molecular weight of the polycarbonate used according to the invention, determined by gel permeation chromatography, can be from 5000 to 80 000, preferably from 10 000 to 70 000 and most preferably from 15 000 to 60 000.

The definition of Ar is preferably as follows:

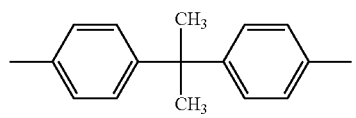

The component system D is preferably the component system D1:

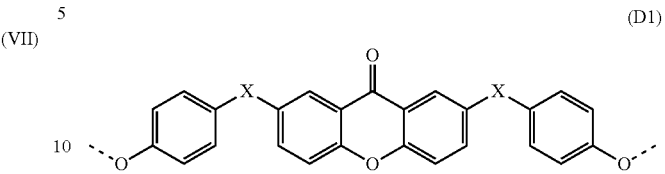

where X=isopropylidene moiety.

The melt polycarbonates described above are mentioned merely by way of example. The total contents of component D1 present in the melt polycarbonate are amounts of from 5 to 450 mg/kg.

For further improvement of rheology or other improvements in properties, such as resistance to UV light and resistance to heat-ageing, additives can be introduced into the branched MeltPC according to the invention, examples being organic phosphorus compounds, mould-release agents, UV absorbers, and aromatic antioxidants, such as sterically hindered phenols. Examples of organic phosphorus compounds suitable according to the invention are phosphines, phosphine oxides, phosphinites, phosphonites, phosphites, diphosphines, diphosphinites, diphosphonites, diphosphites, phosphinates, phosphonates, phosphates, diphosphonates and diphosphate compounds, and also the oligomeric derivatives of the abovementioned phosphorus compounds.

Phosphines optionally used according to the invention are compounds of the general formula (I):

where $Ar_1$ and $Ar_2$ are identical or different unsubstituted or substituted aryl moieties and
R' is an unsubstituted or substituted aryl moiety or one of the following moieties (Ia) to (Ih)

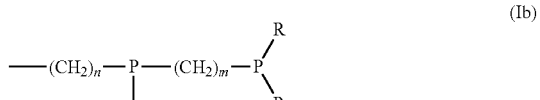

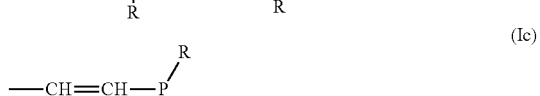

-continued

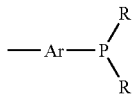

where Ar = R
($C_6$-$C_{14}$-aryl moiety)

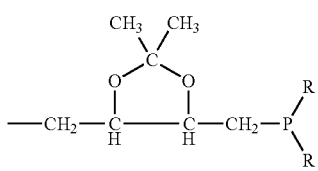

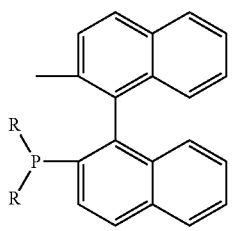

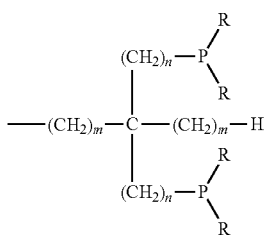

in which
R is respectively an unsubstituted or substituted C6-C14-aryl moiety and
n and m are respectively mutually independently an integer from 1 to 7, where the H atoms of the moieties (Ia) to (Ic) can also have been replaced by substituents, and
where
R' can also be 4-phenylphenyl or α-naphthyl, if both of the Ar moieties in formula (I) are respectively likewise 4-phenylphenyl or α-naphthyl and where the 4-phenylphenyl moieties and the α-naphthyl moieties can have substitution.

Preferred Ar moieties in (I) are phenyl, 4-phenylphenyl and naphthyl.

Suitable substituents of the aryl moieties Ar in (I) are F, CH3, Cl, Br, I, OCH3, CN, OH, alkylcarboxy, phenyl, cycloalkyl, alkyl.

Suitable substituents for the H atoms of the moieties (Ia) to (Ic) are F, $CH_3$, alkyl, cycloalkyl, Cl, aryl.

Preferred numbers "n" and "m" are 1, 2, 3 or 4.

Aryl is respectively independently an aromatic moiety having from 4 to 24 skeletal carbon atoms, in which no, one, two or three skeletal carbon atoms per ring (aromatic ring made of C atoms), but at least one skeletal carbon atom within the entire molecule, can have substitution by heteroatoms selected from the group of nitrogen, sulphur or oxygen. However, it is preferable that aryl means a carbocyclic aromatic moeity having from 6 to 24 skeletal carbon atoms. The same applies to the aromatic portion of an arylalkyl moiety, and also to aryl constituents of groups of greater complexity (e.g. arylcarbonyl or arylsulphonyl moieties).

Examples of $C_6$-$C_{24}$-aryl are phenyl, o-, p-, m-tolyl, naphthyl, phenanthrenyl, anthracenyl or fluorenyl, and examples of heteroaromatic $C_4$-$C_{24}$-aryl in which no, one, two or three skeletal carbon atoms per ring, but at least one skeletal carbon atom within the entire molecule, can have substitution by heteroatoms selected from the group of nitrogen, sulphur or oxygen are pyridyl, pyridyl N-oxide, pyrimidyl, pyridazinyl, pyrazinyl, thienyl, furyl, pyrrolyl, pyrazolyl, imidazolyl, thiazolyl, oxazolyl or isoxazolyl, indolizinyl, indolyl, benzo[b]thienyl, benzo[b]furyl, indazolyl, quinolyl, isoquinolyl, naphthyridinyl, quinazolinyl, benzofuranyl or dibenzofuranyl.

Examples of phosphines suitable according to the invention are triphenylphosphine, tritolylphosphine, tri-p-tert-butylphenylphosphine or their oxides. The phosphine used preferably comprises triphenylphosphine.

Examples of the diarylphosphines to be used according to the invention are 1,2-bis(dipentafluorophenylphosphino)ethane, bis(diphenylphosphino)acetylene, 1,2-bis(diphenylphosphino)benzene,

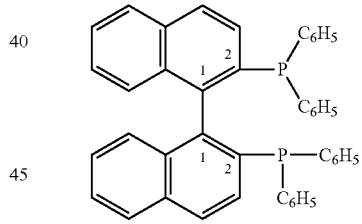

[2,2'-bis(diphenylphosphino)-1,1'-binaphthyl], 2,3-bis(diphenylphosphino)butane, 1,4-bis(diphenylphosphino)butane, 1,2-bis(diphenylphosphino)ethane, cis-1,2-bis(diphenylphosphino)ethylene,

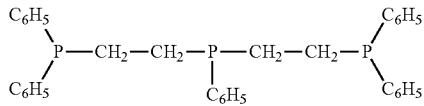

[bis(2-(diphenylphosphino)ethyl)phenylphosphine], bis(diphenylphosphino)methane, 2,4-bis(diphenylphosphino) pentane, 1,3-bis(diphenylphosphino)propane, 1,2-bis(diphenylphosphino)propane,

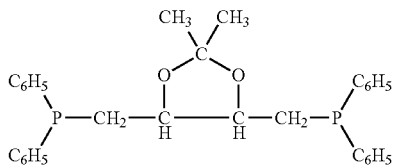

[4,5-O-isopropylidene-2,3-dihydroxy-1,4-bis(diphenylphosphino)butane], tri(4-diphenyl)phosphine and tris(□-naphthyl)phosphine.

The diarylphosphines can be produced by using the information in the following references: Issleib et al., Chem. Ber., 92 (1959), 3175, 3179 and Hartmann et al., Zeitschr. Anorg. Ch. 287 (1956) 261, 264.

It is also possible to use mixtures of various phosphines. The amounts used of the phosphines used are from 10 to 2000 mg/kg, preferably from 50 to 800 mg/kg, more preferably from 100 to 500 mg/kg, based on the total weight of the composition.

The moulding compositions of the invention can also comprise not only the phosphines used but also the corresponding phosphine oxides.

According to the invention, it is in principle optionally possible to use any desired aromatic or aliphatic phosphites or diphosphites. Examples of the most preferred phosphites and diphosphites are triphenyl phosphite, tris(2-tert-butylphenyl) phosphite, tris(2,4-di-tert-butylphenyl) phosphite, tris(2,6-di-tert-butylphenyl) phosphite, tris(2,4,6-tri-tert-butylphenyl) phosphite, tris(2,4,6-tri-tert-butylphenyl)phosphite, tris (2,4,6-tri-tert-butylphenyl)(2-butyl 2-ethylpropane-1,3-diyl) phosphite, bis(2,4-dicumylphenyl) pentaerythritol diphosphite, bis(2,4-di-tert-butylphenyl) pentaerythritol diphosphite, distearyl pentaerythritol diphosphite, tris(p-nonylphenyl) phosphite, diphenyl isodecyl phosphite, diisodecyl phenyl phosphite, triisodecyl phosphite, trilauryl phosphite and tris[(3-ethyloxethanyl-3)methyl]phosphite.

According to the invention, it is in principle optionally possible to use any desired organic UV absorbers B. The UV absorbers are preferably those selected from the group consisting of the triazines, benzotriazoles, benzophenones cyanoacrylates and malonic esters.

Examples of suitable UV absorbers are:
a) Benzotriazole Derivates of Formula (II):

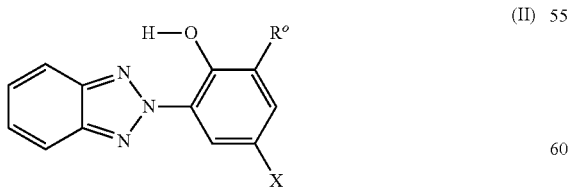

(II)

In formula (II), $R^o$ comprising and X are identical or different and mean H or alkyl or alkylaryl.

Preference is given here to Tinuvin® 329, where X=1,1,3,3-tetramethylbutyl and $R^o$=H, Tinuvin® 350, where X=tert-butyl and $R^o$=2-butyl and Tinuvin® 234, where X and $R^o$=1,1-dimethyl-1-phenyl.

b) Dimeric Benzotriazole Derivatives of Formula (IIa):

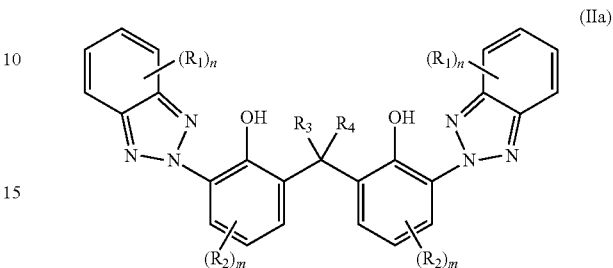

(IIa)

In formula (IIa), R1 and R2 are identical or different and mean H, halogen, C1-C10-alkyl, C5-C10-cycloalkyl, C7-C13-aralkyl, C6-C14-aryl, —OR5 or —(CO)—O—R5, where R5=H or C1-C4-alkyl.

In formula (IIa), R3 and R4 are likewise identical or different and mean H, C1-C4-alkyl, C5-C6-cycloalkyl, benzyl or C6-C14-aryl.

In formula (IIa), m means 1, 2 or 3 and n means 1, 2, 3 or 4.

Preference is given here to Tinuvin® 360, where R1=R3=R4=H; n=4; R2=1,1,3,3-tetramethylbutyl; m=1.

b1) Dimeric Benzotriazole Derivatives of Formula (IIb):

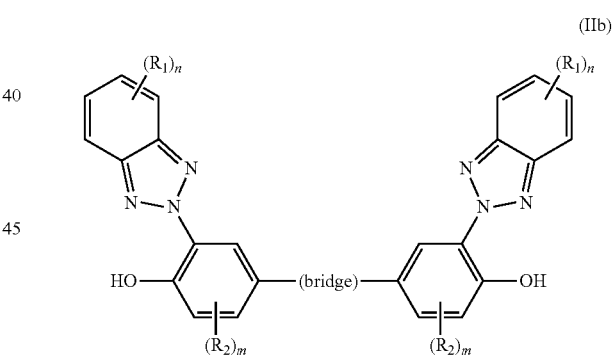

(IIb)

in which the bridge means

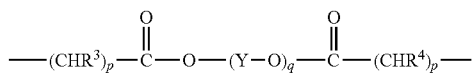

and R, R, m and n have the meaning mentioned for formula (IIb), and in which p is an integer from 0 to 3, q is an integer from 1 to 10, Y is —CH2-CH2-, —(CH2)3-, —(CH2)4-, —(CH2)5-, —(CH2)6-, or CH(CH3)-CH2- and R3 and R4 have the meaning mentioned for formula (IIb).

Preference is given here to Tinuvin® 840, where R1=H; n=4; R2=tert-butyl; m=1; R2 is in ortho-position with respect to the OH group; R3=R4=H; p=2; Y=—(CH2)5-; q=1 c) Triazine Derivatives of Formula (IIc):

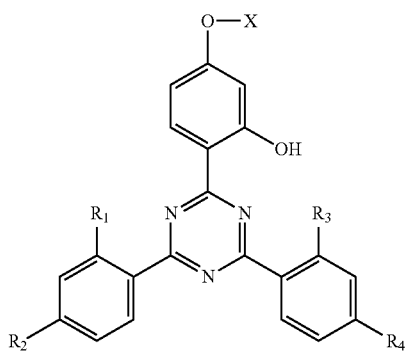

in which R1, R2, R3, R4 are identical or different and are H, alkyl, CN or halogen and X is alkyl.

Preference is given here to Tinuvin® 1577, where R1=R2=R3=R4=H; X=hexyl, and also to Cyasorb® UV-1 164, where R1=R2=R3=R4=methyl; X octyl.

d) Triazine Derivatives of the Following Formula (IId):

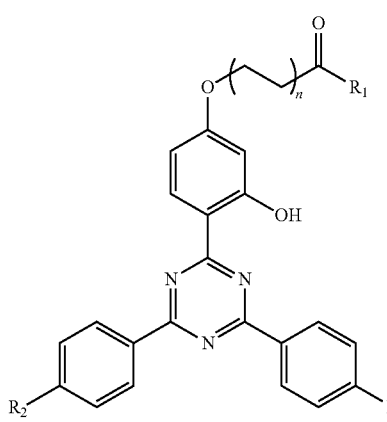

in which R1 means C1-alkyl to C17-alkyl, R2 means H or C1-alkyl to C4-alkyl and n is from 0 to 20.

e) Dimeric Triazine Derivatives of the Formula (IIe):

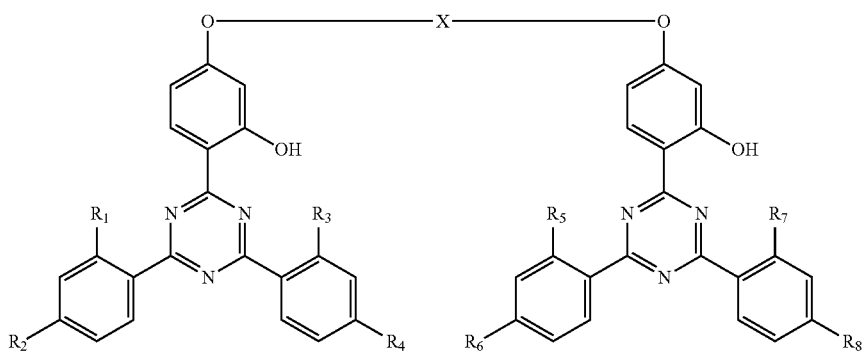

in which R1, R2, R3, R4, R5, R6, R7, R8 can be identical or different and mean H, alkyl, CN or halogen and X is alky-lidene, preferably methylidene or —(CH2CH2-O—)n—C(=O)— and n is from 1 to 10, preferably from 1 to 5, in particular from 1 to 3.

f) Diarylcyanoacrylates of the Formula (IIf):

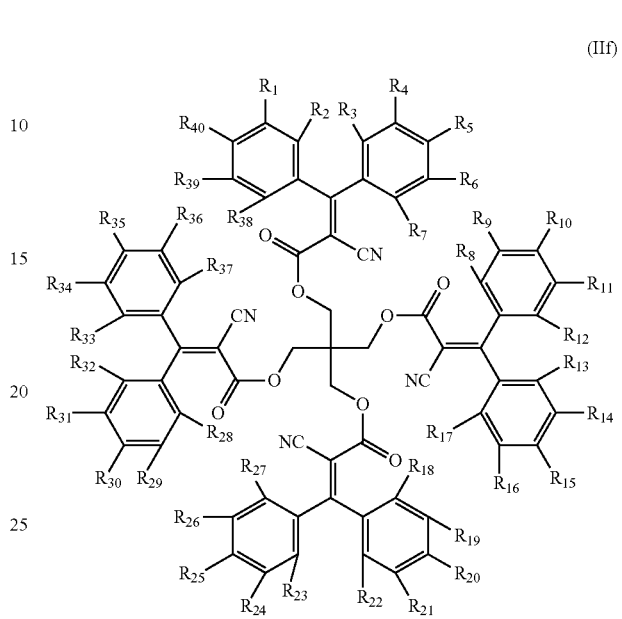

in which R to R40 can be identical or different and mean H, alkyl, CN or halogen.

Preference is given here to Uvinul® 3030, where R1 to R40=H.

g) Malonic Esters of the Formula (IIg):

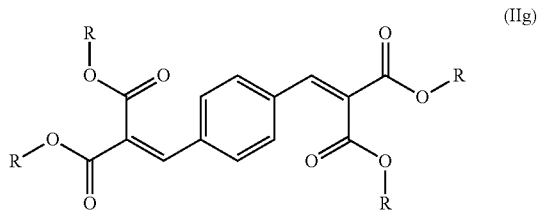

in which R means alkyl. It is preferable that R is C1-C6-alkyl, in particular C1-C4-alkyl and particularly ethyl.

Particularly preferred UV stabilizers for the moulding compositions according to the invention are compounds from the group of the benzotriazoles (a, b and c), from the group of the malonic esters (g) and from the group of the cyanoacrylates (f).

The amounts used of the UV stabilizers are from 0.01% by weight to 15% by weight, based on the moulding composition, preferably from 0.05% by weight to 1% by weight, particularly preferably from 0.1% by weight to 0.4% by weight, based on the moulding composition.

Conventional methods are used to incorporate these UV absorbers into the compositions to be used according to the invention, an example being direct mixing of the UV absorbers in solid or liquid form with the melt of the moulding compositions in known mixing assemblies, e.g. extruders or kneaders, if appropriate also in conjunction with static mixers. The mixing can also preferably be conducted by predispersion of the UV absorbers in a stream of polymer melt, e.g. in mixing assemblies connected to one another composed of, for example, an ancillary extruder in conjunction with a melt-discharge device. The predispersion of the UV absorbers can by way of example also take place via separate production of a masterbatch of up to 15% by weight of UV absorber in a melt polycarbonate. This type of masterbatch can be added to the melt of the moulding compositions either directly or by way of a mixing assembly.

Alkyl phosphates C) used optionally according to the invention are compounds of the general formula (XI):

(XI)

where $R_1$ to $R_3$ can be H, identical or different linear, branched or cyclic alkyl moieties. $C_1$-$C_{18}$ alkyl moieties are particularly preferred. $C_1$-$C_{18}$-Alkyl is by way of example methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, n-heptyl and n-octyl, pinacyl, adamantyl, the isomeric menthyl moieties, n-nonyl, n-decyl, n-dodecyl, n-tridecyl, n-tetradecyl, n-hexadecyl or n-octadecyl.

Examples of alkyl phosphates suitable according to the invention are mono-, di- and trihexyl phosphate, triisooctyl phosphate and trinonyl phosphate. The alkyl phosphate used preferably comprises triisooctyl phosphate (tris-2-ethylhexyl phosphate). It is also possible to use mixtures made of various mono-, di- and trialkyl phosphates.

The amounts used of the alkyl phosphates used are from 0 to 500 mg/kg, preferably from 0.5 to 500 mg/kg, particularly preferably from 2 to 500 mg/kg, based on the total weight of the composition.

Aliphatic carboxylic esters D) optionally used according to the invention are esters of aliphatic long-chain carboxylic acids with mono- or multifunctional aliphatic and/or aromatic hydroxy compounds. Aliphatic carboxylic esters that are used with particular preference are compounds of the general formula (III):

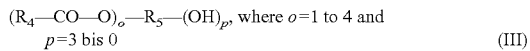

(III)

where $R_4$ is an aliphatic saturated or unsaturated, linear, cyclic or branched alkyl moiety and $R_5$ is an alkylene moiety of a mono- to tetravalent aliphatic alcohol $R_5$—$(OH)_{o+p}$. $C_1$-$C_{18}$ alkyl moieties are particularly preferred for $R_4$. $C_1$-$C_{18}$-Alkyl is by way of example methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, n-heptyl and n-octyl, pinacyl, adamantyl, the isomeric menthyl moieties, n-nonyl, n-decyl, n-dodecyl, n-tridecyl, n-tetradecyl, n-hexadecyl or n-octadecyl.

Alkylene is a straight-chain, cyclic, branched or unbranched $C_1$-$C_{18}$ alkylene moiety. $C_1$-$C_{18}$-Alkylene is by way of example methylene, ethylene, n-propylene, isopropylene, n-butylene, n-pentylene, n-hexylene, n-heptylene, n-octylene, n-nonylene, n-decylene, n-dodecylene, n-tridecylene, n-teetradecylene, n-hexadecylene or n-octadecylene.

In the case of esters of polyfunctional alcohols, it is also possible that free, unesterified OH groups are present. Examples of aliphatic carboxylic esters suitable according to the invention are: glycerol monostearate, palmityl palmitate, and stearyl stearate. It is also possible to use mixtures of various carboxylic esters of the formula (III). Carboxylic esters whose use is preferred are esters of pentaerythritol, glycerol, trimethylolpropane, propanediol, stearyl alcohol, cetyl alcohol or myristyl alcohol with myristic, palmitic, stearic or montanic acid and mixtures thereof. Particular preference is given to pentaerythritol tetrastearate, glycerol monostearate, stearyl stearate and propanediol distearate, and mixtures thereof.

The amounts used of the carboxylic esters are from 0 to 12 000 mg/kg, preferably from 500 to 10 000 mg/kg, particularly preferably from 2000 to 8000 mg/kg, based on the total weight of the composition.

Examples of suitable sterically hindered phenols for optional use are esters of β-(3,5-di-tert-butyl-4-hydroxyphenyl)propionic acid or β-(5-tert-butyl-4-hydroxy-3-methylphenyl)propionic acid or β-(3,5-dicyclohexyl-4-hydroxyphenyl)propionic acid with mono or polyfunctional alcohols, e.g. with methanol, ethanol, butanol, n-octanol, isooctanol, n-octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

The sterically hindered phenol used particularly preferably comprises n-octadecyl 3-(3,5-di-tert-butyl-4-hydroxyphenyl)propionate. The amounts preferably used of the sterically hindered phenol are from 10 to 800 mg/kg, particularly from 30 to 700 mg/kg, very particularly from 40 to 600 mg/kg, based on the total weight of the composition.

The compositions according to the invention (melt polycarbonate moulding compositions) can by way of example be produced by mixing the respective constituents in a known manner and compounding them in the melt at temperatures of from 200° C. to 400° C. in conventional assemblies, such as internal mixers, extruders and twin-screw extruders and extruding them in the melt. The mixing of the individual constituents can take place either successively or else simultaneously and specifically either at about 20° C. (room temperature) or at higher temperature. However, the compounds used according to the invention can also be introduced separately in different phases of the production process into the melt polycarbonate moulding composition. By way of example, it is therefore possible that the alkyl phosphate and/or the phosphine and/or phosphite are introduced into the melt polycarbonate before, or at, the end of the polycondensation process, before aliphatic carboxylic esters are added.

There is no restriction on the form in which the compounds according to the invention are added. The form in which the compounds according to the invention or mixtures of the compounds according to the invention are added to the polymer melt can be solid, e.g. powder, solution or melt. It is preferable that the organic phosphorus compounds and the aliphatic carboxylic esters are metered into the material by way of an ancillary extruder downstream of the last polycondensation stage. Industrial embodiments particularly preferably operate with an ancillary extruder with a throughput of, for example, from 200 to 1000 kg of polycarbonate per hour.

The UV absorbers are preferably added in liquid form at a temperature of about 80 to 250° C. downstream of the polycarbonate-supply hopper, into an ancillary-extruder zone which has mixing elements. The UV absorbers here are taken from a circuit which is preferably maintained at a pressure of from 2 to 20 bar and preferably at a temperature of from 80 to 250° C. A control valve can be used to control the amount added. In another preferred embodiment, the UV absorbers are added in the form of solid to the polycarbonate-supply hopper of the ancillary extruder.

In one preferred embodiment, the optional metering of alkyl phosphates into the material takes place by way of example at room temperature in liquid from together with polycarbonate into the polycarbonate-supply hopper of the ancillary extruder. By way of example, the alkyl phosphate is metered into the material with the aid of a membrane pump or of any other suitable pump. Phosphines and the sterically hindered phenol are preferably added in liquid form at a temperature of about 80 to 250° C. downstream of the polycarbonate-supply hopper, into an ancillary-extruder zone that has mixing elements. The phosphines here are taken from a circuit which is preferably maintained at a pressure of from 2 to 20 bar and preferably at a temperature of from 80 to 250° C. A control valve can be used to control the amount added.

Downstream of the ancillary extruder it is particularly preferably possible to install a gear pump in order to increase pressure. The carboxylic esters used can preferably be metered into the material downstream of the ancillary extruder and upstream of the static mixer by using a membrane pump or any other suitable pump. The form in which the carboxylic esters are then metered into the material downstream of the gear pump is preferably liquid, particularly preferably at from 80 to 250° C. by using a membrane pump at increased pressure, particularly preferably from 50 to 250 bar. As an alternative, the carboxylic esters can also be introduced into the melt stream in the mixing zone of the ancillary extruder by way of a control valve.

In one particularly preferred embodiment, downstream of the ancillary extruder and of all of the additive-metering points, there is a static mixer intended to provide good mixing of all of the additives. The polycarbonate melt from the ancillary extruder is then introduced into the main stream of polycarbonate melt. The mixing of the main stream of melt with the melt stream from the ancillary extruder takes place by way of a further static mixer.

As an alternative to the metering of liquid, it is possible to meter the additives in the form of a masterbatch (concentrate of the additives in polycarbonate) or in pure, solid form by way of the polycarbonate-supply hopper of the ancillary extruder. This type of masterbatch can comprise further additives.

All of the additives can also be introduced subsequently into the polycarbonate, for example by compounding.

The moulding compositions according to the invention can be used for producing mouldings of any type.

These can preferably be produced by extrusion and blow-moulding processes, or else in an appropriate modification by injection moulding. In another form of processing, mouldings are produced by thermoforming from prefabricated sheets or foils.

Examples of the mouldings according to the invention are profiles, foils, housing parts of any type, e.g. for household devices, such as juice presses, coffee machines, mixers; for office machinery, such as monitors, printers, copiers; for sheets and coextruded layers of these, pipes, electrical ducting, windows, doors and profiles for the construction sector, interior fittings and outdoor applications; and by way of example for switches and plugs in the electrical-engineering sector. The mouldings according to the invention can moreover be used for interior fittings and components of rail vehicles; of ships, of aircrafts, of buses and of other motor vehicles, and also for motor-vehicle-bodywork parts.

The mouldings according to the invention can be transparent, translucent or opaque. Other mouldings are in particular optical and magnetooptical data-storage systems, such as minidisc, compact disc (CD) or digital versatile disc (DVD), packaging for food or for drinks, optical lenses and prisms, lenses for lighting applications, automobile headlamp lenses, glazing for construction vehicles and for other motor vehicles, panels of any type, for example for greenhouses, and what are known as twin-web sandwich panels or panels having cavities.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Characterization of the Moulding Compositions According to the Invention (Test Methods)

Melt Viscosity

Rheological properties are determined by measuring the melt viscosity of the moulding compositions according to the invention in [Pa·s] at temperatures of 320° C. as a function of shear gradient (eta), which was varied from 100 to 1000 [1/s]. The measurement was made to ISO 11443 with the aid of a capillary rheometer.

Determination of Relative Viscosity (Etarel.):

Relative solution viscosity etarel. is determined in methylene chloride (0.5 g of polycarbonate/l) at 25° C. in an Ubbelohde viscometer.

Average Molecular Weight (Mw)

Average molecular weight Mw is determined on a 0.2 percent strength solution of the polymer in dichloromethane, by using gel permeation chromatography (GPC) and UV detection. The GPC is calibrated with linear PC standards.

Melt Volume Flow Rate (MVR)

Melt volume flow rate (MVR) is determined at 300° C. with 1.2 kg load to ISO 1133, with melt-index-testing equipment.

Compounds D1

The concentration of the compounds D1 is determined after alkaline hydrolysis of the polycarbonate and subsequent analysis of the hydrolysate by HPLC. The compound was characterized by nucleomagnetic resonance spectroscopy.

THPE Content

The concentration of THPE is determined after alkaline hydrolysis of the polycarbonate and subsequent analysis of the hydrolysate by HPLC. An external standard was used for calibration.

YI and After-Yellowing. (ΔYI)

The optical properties of the moulding compositions according to the invention are determined by measuring what is known as the yellowness index (YI) on standard test specimens to ASTM E313. These standard test specimens are colour-sample plaques (60*40*4 mm) which were produced from the MeltPC compositions at a melt temperature of 300° C. and at a mould temperature of 90° C. After-yellowing (ΔYI) is determined as the difference calculated from the measured YI value of the colour-sample plaques fresh from injection-moulding and the YI value measured for the same colour-sample plaques after heat-ageing.

Heat-Ageing

In examples 11, 12 and 22-24 (see below), discoloration (yellowing) was tested in a heat-ageing process. For this, standard test specimens made of polycarbonate (60×40×4 mm) were aged at 135° C. for 1000 h in a convection oven. YI to ASTM E313 is then determined. The difference from the control specimen (prior to ageing) is calculated (=ΔYI 1000 h).

Parent Resins without Additives

MeltPC was produced in a multistage process. First, the starting materials BPA, DPC (9000.1 g), tetraphenylphosphonium phenolate (0.7 g) and THPE were melted at about 190° C. in a stirred tank and stirred for 45 minutes after melting. The amount used of BPA was selected in such a way that the resultant DPC/BPA ratio based on the molar amounts was 110, 108 or 107 mol % based on BPA at the beginning of the reaction. THPE content was selected relative to BPA on the basis of the molar amounts in such a way that the amounts of THPE added were 0.3; 0.4 or 0.5 mol %, based on BPA. The constitution of the respective example can be found in table 1.

Purification of 1,1,1-tris(4-hydroxyphenyl)ethane (THPE) Containing Metal Ions:

A sulphonic-acid-treated ion exchanger (Lewatit K1221, Lanxess AG) is washed with demineralized water at room temperature until free from electrolyte, in a glass column, where the volume flow rate is held constant at 0.3 ml of water per ml of ion exchanger per hour. After 24 h, conductivity in the column eluate is 7 μS/cm. The liquid aqueous phase is discharged, and the ion exchanger is treated with methanol.

The ion exchanger washed free from electrolyte is then flushed with methanol at room temperature until the water content in the methanolic eluate from the column is smaller than 0.5% by weight. The volume flow rate here is held constant at 0.3 ml of methanol per ml of ion exchanger per hour. The resultant methanol-conditioned ion exchanger is used for the purification of solutions which comprise 1,1,1-tris(4-hydroxyphenyl)ethane (THPE).

A 20% strength by weight methanolic THPE solution is passed over the resultant conditioned ion exchanger at room temperature. The volume flow rate applied to the ion exchanger here is 0.3 ml of THPE solution per ml of ion exchanger. The ion exchanger is then flushed twice with methanol, the flushing volume used respectively being the volume of the methanol-moist ion exchanger in the column. All of the eluate from the column is collected and concentrated by evaporation at 45° C. in the vacuum provided by a water jet until a solution of about 50% strength by weight of THPE in methanol is obtained. This methanolic THPE solution is added to twice its volume of demineralized water at room temperature, with stirring. The white precipitate is removed by filtration and dried to constant weight at 50° C. for 48 h, and also at 65° C. for 48 h, in the vacuum provided by a water jet.

Yield: 96.9%

Sodium content of 1,1,1-tris(4-hydroxyphenyl)ethane prior to purification: 8.3 ppm Sodium content of 1,1,1-tris(4-hydroxyphenyl)ethane after purification: 610 ppb In the case of the examples 5-10 according to the invention and in the case of PC1, the THPE used was purified on the acidic ion exchanger prior to use in the MeltPC reaction. For the examples 1-4 which were not according to the invention, commercially available THPE was used without prior purification.

After a reaction time of 45 min at 190° C. at atmospheric pressure under nitrogen, the reaction mixture is transferred to the input of a falling-film evaporator. A vacuum of about 200 mbar is applied in the falling-film evaporator, with a starting temperature of 190° C., and the reaction mixture is circulated by pumping in a circuit through an externally heated gravity-flow tube. The amount circulated by the pump per unit of time is held constant over the time of the experiment, and, at the start of the reaction in the falling-film evaporator, amounts to four times the volume of liquid transferred per hour into the falling-film evaporator. Phenol produced during the reaction is removed by distillation, condensed in a condenser and thus removed from the reaction mixture. After a residence time of 16 minutes, the pressure is reduced to 100 mbar and the temperature is increased to 220° C. During this process, the reaction mixture is circulated by pumping in a circuit through the gravity-flow tube. After a residence time of 16 minutes, the pressure is reduced to 75 mbar and the temperature is increased to 250° C. During this process, the reaction mixture is circulated by pumping in a circuit through the gravity-flow tube. After a residence time of 16 minutes, the pressure is reduced to 50 mbar and the temperature is increased to 265° C. During this process, the reaction mixture is circulated by pumping in a circuit through the gravity-flow tube. After a residence time of 16 minutes, the reaction mixture is transferred to a disc reactor. In the disc reactor, the condensation process of the reaction mixture continues while the discs rotate at a temperature of from 270 to 280° C. and at a pressure of from 4 to 6 mbar, while phenol formed by the condensation process is continuously removed by distillation and thus removed from the reaction mixture. After 45 minutes, the pressure is reduced to from 0.5 to 2 mbar and the temperature is increased to from 300 to 310° C. The mixture is held under these reaction conditions until the desired final viscosity is achieved. The polymer melt is then conveyed out of the disc reactor with the aid of a gear pump, discharged by way of a die plate and then pelletized in a water bath after cooling and solidification.

Table 1 gives an overview of the various experiments with various THPE grades. Examples 1-4 are not according to the invention, while Examples 5-10 and PC1 are according to the invention. PC1 is the physical mixture of a total of 13 individual experiments which differ in eta rel. value by less than ±0.006. PC1 was used as parent resins for producing the compounded materials with additives (Examples 11-24, Table 2).

As Table 1 shows, the Examples 1-4 not according to the invention exhibit markedly higher contents of the structure D1, more than 450 mg/kg, in contrast to the Examples 5-10 according to the invention, where the contents of the structure D1 are smaller than 450 mg/kg. The ratio of THPE to D1 is markedly smaller than 10 in the examples not according to the invention, and is markedly greater than 10 in the examples according to the invention.

Examples with Additives:

The compounded materials according to the invention were produced in a ZE25/5 extruder from Berstorff, Hanover, with a throughput of 10 kg/hour. The barrel temperatures were 320° C. The form in which the various additives were metered in was that of a powder mixture with polycarbonate powder—5% by weight, based on total ingoing weight.

Raw Materials Used:

PC 1 is a THPE-branched melt polycarbonate without additives, based on bisphenol A, DPC (diphenyl carbonate) and 0.35% by weight of trishydroxyphenylethane (THPE). D1: 225 ppm. THPE/D1 ratio: 15.6. MVR 3.5 cm$^3$/10 min (300° C./1.2 kg).

PC 2 is a solution polycarbonate powder as aid to introduction of the additives into the compounded materials without additives, based on bisphenol A, with MVR 19 cm$^3$/10 min (300° C./1.2 kg). D1 below detectable limit.

| | |
|---|---|
| TPP: | triphenylphosphine |
| Irgafos 168: | tris(2,4-tert-butylphenyl) phosphite |
| Trialkyl phosphite: | tris[(3-ethyl-3-oxetanyl)methyl] phosphite |
| PETS: | pentaerythritol tetrastearate |
| Loxiol G32: | stearyl stearate |
| Tinuvin 329: | 2-(2-hydroxy-5-tert-octylphenyl)benzotriazole |
| Tinuvin 360: | bis[2-hydroxy-5-tert-octyl-3-(benzotriazol-2-yl)phenyl]methane |
| Hostavin B-cap: | tetraethyl p-phenylenebis(methylene)malonate |
| Uvinul 3030: | 1,3-bis[[(2-cyano-3,3-diphenylacryloyl)oxy]-2,2-bis[[(2-cyano-3,3-diphenylacryloyl)oxy]methyl]propane |
| Irganox 1076: | n-octadecyl 3-(3,5-di-tert-butyl-4-hydroxyphenyl)propionate |

Table 2 shows the constitution of the resultant compounded materials, the melt viscosity at 320° C. for eta=from 100 to 1000 [l/s], the relative viscosity and the ΔYI 1000 h on 4 mm plaques, for selected specimens. Example 8 according to the invention has also been included in the list as comparison.

The data in Table 2 provide evidence that all of the Examples 8 and 11-24 according to the invention have higher melt viscosity at the various shear rates than the Examples 3 and 4 not according to the invention. This is surprising, since the relative viscosity and the content of THPE (branching agent) for Examples 3 and 4 not according to the invention are comparable with the values for the Examples 8 and 11-24 according to the invention. The data in Table 2 therefore provide evidence that the Examples 8 and 11-24 according to the invention, with a THPE/D1 ratio≧10 have markedly higher melt stability than the Examples 3 and 4 not according to the invention, with THPE/D1<8. This is all the more surprising since Examples 12-24 comprise additives which generally lead to increased flowability and thus to lower melt viscosity. This behaviour was described by way of example in German laid-open specification DE 10 2009 043512.3, which had not yet been published at the filing date. The examples in Table 2 therefore provide evidence of the superiority of the use of THPE which has been previously purified on the ion exchanger.

The compounded materials, where these comprise phosphine or phosphite and, if appropriate, a sterically hindered phenol (Examples 12, 22-24) are markedly stabler during heat-ageing than Example 11 without additives, as can be seen from the ΔYI 1000 h values. Surprisingly, Example 23, with an aromatic phosphite, is superior in terms of yellowing to Example 24, which comprises a combination of a phosphine and n-octadecyl 3-(3,5-di-tert-butyl-4-hydroxyphenyl) propionate. This could not have been expected on the basis of the German laid-open application DE 10 2009 043509.3, which had not yet been published at the filing date. The said unpublished laid-open specification describes MeltPCs without THPE, where the combination of a phosphine with n-octadecyl-3-(3,5-di-tert-butyl-4-hydroxyphenyl)propionate provides the best protection from yellowing during heat-ageing and is superior to the use of Irgafos 168.

TABLE 1

Examples of production of MeltPC with different amounts and grades of THPE.

| Example No. | According to the invention | DPC/BPA | Mol % of THPE | Mw, GPC (UV) [g/mol] | THPE in product [mg/kg] | D1 in product [mg/kg] | THPE/D1 ratio |
|---|---|---|---|---|---|---|---|
| 1 | No | 110 | 0.3 | 34510 | 3400 | 739 | 4.6 |
| 2 | No | 110 | 0.3 | 45977 | 3600 | 1225 | 2.9 |
| 3 | No | 110 | 0.3 | 30436 | 3400 | 467 | 7.3 |
| 4 | No | 110 | 0.3 | 33474 | 3500 | 644 | 5.4 |
| 5 | Yes* | 107 | 0.3 | 25414 | 3600 | 183 | 19.7 |
| 6 | Yes* | 107 | 0.3 | 24696 | 3600 | 205 | 17.6 |
| 7 | Yes* | 107 | 0.3 | 25110 | 3500 | 232 | 15.1 |
| 8 | Yes* | 107 | 0.4 | 29984 | 4600 | 127 | 36.2 |
| 9 | Yes* | 107 | 0.5 | 23399 | 5800 | 180 | 32.2 |
| 10 | Yes* | 107 | 0.5 | 26771 | 5700 | 325 | 17.5 |
| PC1 | Yes* | 108/107 | 0.3 | 32867 | 3500 | 225 | 15.6 |

*In the case of the examples according to the invention, the THPE was purified on the ion exchanger prior to use in the MeltPC reaction.

TABLE 2

Examples of THPE-branched MeltPC with and without additives.

| Example No. | 3 | 4 | 8 | 11 | 12 | 13 | 14 | 15 | 16 | 17 |
|---|---|---|---|---|---|---|---|---|---|---|
| Example according to the invention | No | No | Yes * | Yes * | Yes * | Yes * | Yes * | Yes * | Yes * | Yes * |
| PC1 (%) | | | | 95 | 95 | 95 | 95 | 95 | 95 | 95 |
| PC2 (%) | | | 5 | 4.450 | 4.350 | 4.475 | 4.490 | 4.650 | 4.050 |
| TPP (%) | | | | 0.05 | 0.05 | 0.025 | 0.01 | 0.05 | 0.05 |
| Irgafos 168 (%) | | | | | | | | | | |
| Trialkyl phosphite (%) | | | | | | | | | | |
| PETS (%) | | | | 0.4 | 0.4 | 0.4 | 0.4 | 0.2 | 0.8 |
| Loxiol G32 (%) | | | | | | | | | | |
| Tinuvin 360 (%) | | | | 0.1 | 0.2 | 0.1 | 0.1 | 0.1 | 0.1 |
| Tinuvin 329 (%) | | | | | | | | | | |
| Hostavin B-Cap (%) | | | | | | | | | | |
| Uvinul 3030 (%) | | | | | | | | | | |
| Irganox 1076 (%) | | | | | | | | | | |
| THPE/D1 | 7.3 | 5.4 | 36.2 | 15.6 | 15.6 | 15.6 | 15.6 | 15.6 | 15.6 | 15.6 |
| Eta rel. of pellets | 1.281 | 1.291 | 1.283 | 1.289 | 1.293 | 1.293 | 1.291 | 1.291 | 1.291 | 1.287 |
| Melt viscosity at 320° C. | | | | | | | | | | |
| Eta = 100 [1/s] | 154 | 156 | 342 | 258 | 239 | 240 | 229 | 222 | 185 | 180 |
| Eta = 500 [1/s] | 128 | 128 | 221 | 198 | 191 | 199 | 182 | 185 | 165 | 150 |
| Eta = 1000 [1/s] | 110 | 109 | 176 | 164 | 160 | 161 | 153 | 153 | 139 | 126 |
| Heat-ageing | | | | | | | | | | |
| ΔYI 1000 h | n.d. | n.d. | n.d. | 25.7 | 18.0 | n.d. | n.d. | n.d. | n.d. | n.d. |

| Example No. | 18 | 19 | 20 | 21 | 22 | 23 | 24 |
|---|---|---|---|---|---|---|---|
| Example according to the invention | Yes * | Yes * | Yes * | Yes * | Yes * | Yes * | Yes * |
| PC1 (%) | 95 | 95 | 95 | 95 | 95 | 95 | 95 |
| PC2 (%) | 4.350 | 4.350 | 4.350 | 4.450 | 4.450 | 4.450 | 4.400 |
| TPP (%) | 0.05 | 0.05 | 0.05 | 0.05 | | | 0.05 |
| Irgafos 168 (%) | | | | | | 0.05 | |
| Trialkyl phosphite (%) | | | | | 0.05 | | |
| PETS (%) | 0.4 | 0.4 | 0.4 | | 0.4 | 0.4 | 0.4 |
| Loxiol G32 (%) | | | | 0.4 | | | |
| Tinuvin 360 (%) | | | | 0.1 | 0.1 | 0.1 | 0.1 |
| Tinuvin 329 (%) | 0.2 | | | | | | |
| Hostavin B-Cap (%) | | 0.2 | | | | | |
| Uvinul 3030 (%) | | | 0.2 | | | | |
| Irganox 1076 (%) | | | | | | | 0.05 |
| THPE/D1 | 15.6 | 15.6 | 15.6 | 15.6 | 15.6 | 15.6 | 15.6 |
| Eta rel. of pellets | 1.288 | 1.287 | 1.290 | 1.290 | 1.302 | 1.305 | 1.292 |
| Melt viscosity at 320° C. | | | | | | | |
| Eta = 100 [1/s] | 211 | 273 | 232 | 247 | 422 | 503 | 197 |
| Eta = 500 [1/s] | 183 | 208 | 160 | 221 | 293 | 328 | 146 |
| Eta = 1000 [1/s] | 153 | 167 | 134 | 175 | 230 | 256 | 120 |
| Heat-ageing | | | | | | | |
| ΔYI 1000 h | n.d. | n.d. | n.d. | n.d. | 17.1 | 7.2 | 8.3 | n.d.: not determined.
* In the case of the examples according to the invention, the THPE was purified on the ion exchanger prior to use in the MeltPC reaction.

The invention claimed is:

1. An aromatic branched polycarbonate, produced via melt transesterification of a bisphenol with a diaryl carbonate in the presence of a branching agent, wherein the aromatic branched polycarbonate comprises branching point structures and structures of formula (D)

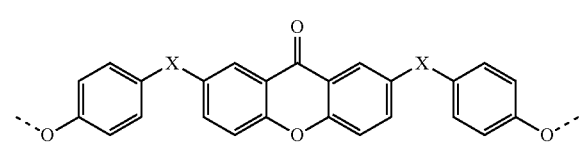
(D)

wherein X is a single bond, C1- to C6-alkylene, C2- to C5-alkylidene or C5- to C6-cycloalkylidene, optionally substituted by C1- to C6-alkyl;

wherein the amount of D in the aromatic branched polycarbonate is in the range of from 5 to 450 mg per kg of the aromatic branched polycarbonate; and wherein the ratio of the total branching point structures to the total structures of the formula D in the aromatic branched polycarbonate is in the range of from 8 to 200.

2. A composition comprising at least one polycarbonate according to claim 1 and at least one organic phosphorus compound selected from the group consisting of phosphines, phosphites, diphosphites, phosphates and mixtures thereof.

3. The composition according to claim 2, wherein the at least one organic phosphorus compound is a phosphite and is tris(2,4-tert-butylphenyl) phosphite.

4. The composition according to claim 2, wherein the composition further comprises an aliphatic carboxylic ester of formula (III)

$$(R_4-CO-O)_o-R_5-(OH)_p \quad (III)$$

where o is an integer from 1 to 4, p is an integer from 0 to 3, $R_4$ is an aliphatic, saturated or unsaturated, linear, cyclic or branched alkyl moiety, and $R_5$ is an alkylene moiety of a mono- to tetravalent aliphatic alcohol of the formula $R_5-(OH)_{o+p}$.

5. The composition according to claim 2, wherein the composition further comprises a UV absorber selected from the group consisting of benzotriazoles, triazines, cyanoacrylates and malonic esters.

6. The composition according to claim 2, wherein the at least one organic phosphorus compound is a phosphine and the phosphine has the following structure:

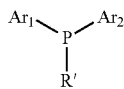
(I)

wherein $Ar_1$ and $Ar_2$ are, independently of one another, optionally substituted aryl moieties; and R' is an optionally substituted aryl moiety or at least one moiety selected from the group consisting of

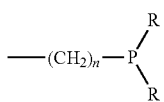
(Ia)

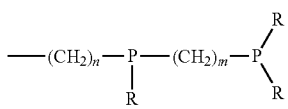
(Ib)

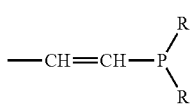
(Ic)

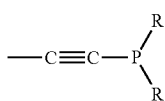
(Id)

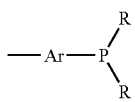
(Ie)

where Ar = R
($C_6$-$C_{14}$-aryl moiety)

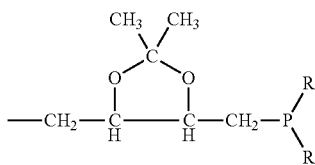
(If)

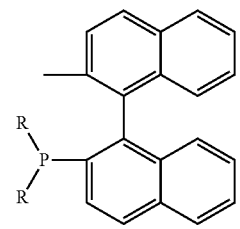
(Ig)

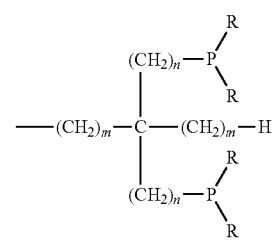
(Ih)

wherein R represents an unsubstituted or substituted $C_6$-$C_{14}$-aryl moiety; and n and m are independently of one another, an integer from 1 to 7, wherein the H atoms of the moieties (Ia) to (Ic) can also be replaced by substituents; and wherein R' can also be 4-phenylphenyl or α-naphthyl, if $Ar_1$ and $Ar_2$ in formula (I) are respectively likewise 4-phenylphenyl or α-naphthyl and wherein the 4-phenylphenyl moieties and the α-naphthyl moieties can have substitution.

7. The composition according to claim 6, wherein the phosphine is triphenylphosphine.

8. The composition according to claim 2, wherein the composition further comprises an aromatic antioxidant.

9. The composition according to claim 8, wherein the aromatic antioxidant is n-octadecyl 3-(3,5-di-tert-butyl-4-hydroxyphenyl)propionate.

10. A process for producing polycarbonates according to claim 1, wherein said process comprises reacting a bisphenol with a diaryl carbonate in the presence of a branching agent in a melt transesterification process; and purifying the branching agents prior to using the branching agents in the melt transesterification process.

11. The process according to claim 10, further comprising pretreating the branching agents with a cation exchanger in solution before using the branching agents in the melt transesterification process.

12. The process according to claim 10, wherein the branching agent is 1,1,1-tris(4-hydroxyphenyl)ethane (THPE).

13. The process according to claim 10 wherein the melt transesterification process further comprises a catalyst of formula (VII)

(VII)

wherein $R_9$, $R_{10}$, $R_{11}$ and $R_{12}$ represent, independently of one another, a compound selected from the group consisting of $C_1$- to $C_{18}$-alkylene moieties, $C_6$ to $C_{10}$-aryl moieties, and $C_5$ to $C_6$-cycloalkyl moieties; and $X^-$ represents an anion, wherein the corresponding acid-base pair $H^+ + X^- \rightarrow HX$ has a $pK_b$ of less than 11.

* * * * *